United States Patent [19]

Yanagishita

[11] Patent Number: 5,261,726
[45] Date of Patent: Nov. 16, 1993

[54] POSITION ADJUSTABLE HEADREST
[75] Inventor: Norio Yanagishita, Kanagawa, Japan
[73] Assignee: Ikeda Bussan Co., Ltd., Ayase, Japan
[21] Appl. No.: 783,672
[22] Filed: Oct. 29, 1991
[30] Foreign Application Priority Data Oct. 29, 1990 [JP] Japan .................... 2-291185

[51] Int. Cl.⁵ .............................. A47C 7/36
[52] U.S. Cl. .................... 297/408; 297/391;
297/DIG. 1; 297/DIG. 2
[58] Field of Search ........... 297/408, 391, 397, 409,
297/410, DIG. 1, DIG. 2, 220

[56] References Cited

U.S. PATENT DOCUMENTS

| 1,854,068 | 4/1932 | Rotner | 297/220 |
| 4,003,599 | 1/1977 | Takamatsu | 297/220 |
| 4,674,792 | 6/1987 | Tamura et al. | 297/408 |
| 4,848,836 | 7/1989 | Masui | 297/220 |
| 4,880,275 | 11/1989 | Lanteri | 297/391 |

FOREIGN PATENT DOCUMENTS

| 0130918 | 1/1985 | European Pat. Off. | 297/408 |
| 63-55954 | 11/1988 | Japan . | |
| 2063065 | 6/1981 | United Kingdom | 297/DIG. 2 |
| 2219964 | 12/1989 | United Kingdom | 297/DIG. 1 |

Primary Examiner—Kenneth J. Dorner
Assistant Examiner—Milton Nelson, Jr.
Attorney, Agent, or Firm—Foley & Lardner

[57] ABSTRACT

A position adjustable headrest includes a bag-shaped outer skin member defining an inside space thereof. The outer skin member has first inwardly-bent end portions which are opposed to and in abutment with each other. The first inwardly-bent end portions define a first slit therebetween. The outer skin member has second and third slits formed therethrough which are opposed to each other and extend from longitudinally opposed ends of the first slit. A pad member made of plastic is covered by the outer skin member. The plastic is foamed and cured in the inside space so as to fill the inside space with the plastic and to press the first inwardly-bent end portions against each other, thereby closing the first slit tightly to prevent the plastic from leaking out through the first slit. Two stays project outwardly through the second and third slits respectively.

7 Claims, 2 Drawing Sheets

POSITION ADJUSTABLE HEADREST

BACKGROUND OF THE INVENTION

1. Field of the Invention

The present invention relates to an angular position adjustable headrest which is pivotally movable to a desired angular position relative to a seatback to effectively and comfortably support the head of a seat occupant.

2. Description of the Prior Art

Hitherto, various kinds of headrests have been proposed and put into practical use in the field of automotive seats in order to give safety and comfortable sitting posture to seat occupants. In order to improve the comfort, some of them are of a position adjustable type which is adjustable in angular position relative to the seatback on which the headrest is mounted.

One of the conventional position adjustable headrests comprises a bag-shaped outer skin member which has a slit, a pad member which is covered with the outer skin member, two stays projecting outwardly from the outer skin member for attaching the headrest proper to a seatback, a headrest frame which is connected to the stays and surrounded by the pad member, and a position adjusting mechanism which is connected to the headrest frame and surrounded by the pad member.

In order to manufacture the position adjustable headrest, a method has been widely employed, which generally comprises the steps of placing a bag-shaped outer skin member in a mold, inserting an assembled unit comprising the stays, the headrest frame and the position adjusting mechanism through the slit of the outer skin member into an inside space enclosed by the outer skin member having the stays projected outwardly through the slit, pouring a liquid material for foamed plastic into the inside space, curing the material, and removing a product, viz., a headrest comprising a skin-covered foamed plastic, from the mold when the material is hardened to a sufficient level.

However, the above-mentioned position adjustable headrest has the following drawback.

Upon curing the liquid material for the foamed plastic, the material tends to leak out through the slit of the outer skin member. If this happens, extra work is required to remove the liquid material leaked out. The above-mentioned conventional position adjustable headrest does not have means for easily preventing the material from leaking out through the slit.

SUMMARY OF THE INVENTION

It is therefore an object of the present invention to provide a position adjustable headrest which has means for easily preventing the liquid material from leaking out through the slit of the outer skin member.

According to a first aspect of the present invention, there is provided a position adjustable headrest including: a bag-shaped outer skin member having an inside space defined therein, the outer skin member having first inwardly-bent end portions which are opposed to and in abutment with each other, the first inwardly-bent end portions defining a first slit therebetween, the outer skin member having a second slit formed therethrough which is united with the first slit, the outer skin member having a first portion partially bounded by the first and second slits, the first portion defining a first opening when the first portion is turned up; a pad member covered by the outer skin member, the pad member being made of plastic, the plastic being foamed and cured in the inside space so as to fill the inside space with the plastic and to press the first inwardly-bent end portions against each other, thereby closing the first slit tightly to prevent the plastic from leaking out through the first slit; a headrest frame embedded in the pad member, the headrest frame being so sized as to be inserted into the inside space through the first opening; a stay pivotally connected to the headrest frame, the stay projecting outwardly through the second slit, the stay being movable in the second slit; and means for closing the second slit for preventing the plastic from leaking out through the second slit.

According to a second aspect of the present invention, there is provided a position adjustable headrest including: a bag-shaped outer skin member defining an inside space thereof, the outer skin member having first inwardly-bent end portions which are opposed to and in abutment with each other, the first inwardly-bent end portions defining a first slit therebetween, the outer skin member having second and third slits formed therethrough which are opposed to each other and extend from longitudinally opposed ends of the first slit, the outer skin member having a second portion partially bounded by the first, second and third slits, the second portion defining a second opening when the second portion is turned up; a pad member covered by the outer skin member, the pad member being made of plastic, the plastic being foamed and cured in the inside space so as to fill the inside space with the plastic and to press the first inwardly-bent end portions against each other, thereby closing the first slit tightly to prevent the plastic from leaking out through the first slit; a headrest frame embedded in the pad member, the headrest frame being so sized as to be inserted into the inside space through the second opening; the stays pivotally connected to the headrest frame, the stays projecting outwardly through the second and third slits respectively; and means for closing the second and third slits for preventing the plastic from leaking out through the second and third slits.

DESCRIPTION OF THE PREFERRED EMBODIMENTS

Figure 1:
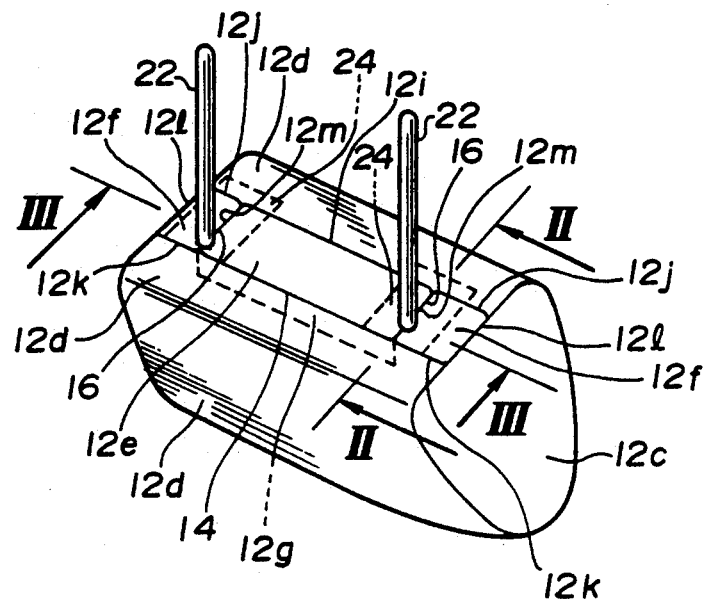
FIG. 1 is a perspective view of a position adjustable headrest, which is a first embodiment of the present invention, the headrest being shown turned upside down for clarification of the drawing.
Figure 2:
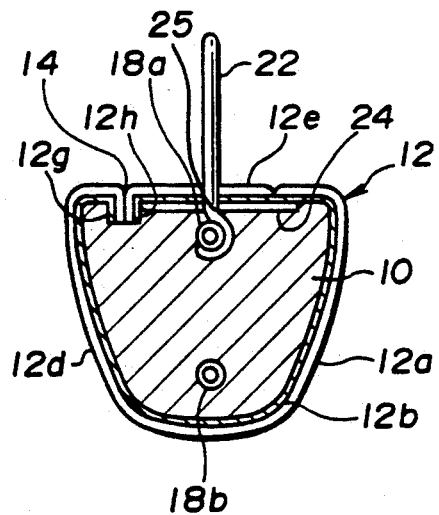
FIG. 2 is a sectional view which is taken along the line II—II of FIG. 1.
Figure 3:
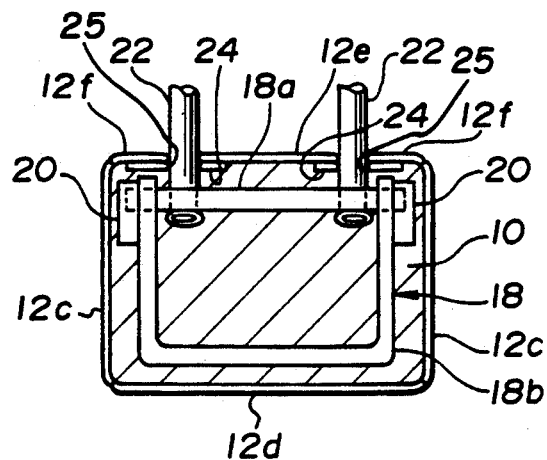
FIG. 3 is a sectional view which is taken along the line III—III of FIG. 1.

Referring to FIGS. 1 to 3, there is shown a position adjustable headrest, which is a first embodiment of the present invention.

As is seen from FIGS. 2 and 3, the headrest of the present invention which is shown turned upside down in the drawings comprises a pad member 10 and a bag-shaped outer skin member 12 covering the pad member 10. The outer skin member 12 comprises an outer skin layer 12a and a wadding 12b lined on a back surface of the outer skin layer 12a. The outer skin layer 12a is made of vinyl chloride or the like which is flexible. However, if desired, a sheet of suitable synthetic resin can be substituted for the outer skin layer 12a and the wadding 12b.

As is seen from FIG. 1, the outer skin member 12 comprises two side portions 12c, a major center portion 12d, a base center portion 12e and two base side portions 12f. The major center portion 12d covers front, rear and top surfaces of the pad member 10, and covers front and rear portions of a base surface of the pad member 10.

As is seen from FIG. 2, the major center portion 12d comprises a major rectangular portion covering the pad member 10, and a first inwardly-bent end portion 12g which is rectangular in shape. The base center portion 12e comprises a major rectangular portion covering a part of the base surface of the pad member 10, and another first inwardly-bent end portion 12h which is rectangular in shape. The first inwardly-bent end portion 12h has the same size as that of the first inwardly-bent end portion 12g, and is opposed to and in abutment with the same. A long slit 14 is defined between the first inwardly-bent end portions 12g and 12h. The base center portion 12e is stitched at its edge 12i opposite to the long slit 14 to the major center portion 12d. Each of the base side portions 12f is stitched at its first and second edges 12j and 12k to the major center portion 12d, and at its outer side edge 12l to the side portions 12c. The base side portions 12f are not stitched at their inner side edges 12m to the base center portion 12e. Therefore, two parallel short slits 16 are defined between the base center portion 12e and the base side portions 12f.

As will be clarified hereinafter, the long slit 14 and the short slits 16 are closed entirely upon completion of the headrest.

As is seen from FIG. 3, a headrest frame 18 is embedded in the pad member 10. The headrest frame 18 comprises a lower frame shaft 18a and a U-shaped upper frame 18b which is pivotally connected to the lower frame shaft 18a. Two core cases 20 are secured to the upper frame 18b and pivotally connected to the lower frame shaft 18a. One of the core cases 20 has a known position adjusting mechanism (not shown) installed therein. The position adjusting mechanism may be a device which is disclosed in U.S. Pat. No. 4,674,792 granted on Jun. 23, 1987 to Hisao TAMURA et al. The mechanism is hermetically sealingly encased in the core case 20 for the reason which will be clarified hereinafter.

Two parallel headrest stays 22 project from the outer skin member 12. Although not shown in the drawings, the headrest stays 22 are put into respective holes formed at a top of a seatback of a seat upon practical use of the headrest. The top end portion of each headrest stay 22 is secured to the lower frame shaft 18a. Thus, the headrest proper is pivotal about the lower frame shaft 18a. By the provision of the position adjusting mechanism, the headrest proper can be locked to a desired angular position relative to the headrest stays 22.

The above-mentioned short slits 16 have sufficient length for allowing the smooth movement of the headrest stays 22 relative to the headrest proper. The short slits 16 are united at their respective ends with side ends of the longer slit 14, thereby forming a U-shaped slit (see FIG. 1).

As is clearly seen from FIG. 2, two patches 24 made of thin nonwoven cloth such as felt or the like are lined on a back surface of the outer skin member 12 for the reason which will be clarified hereinafter. Each patch 24 is so sized as to cover the short slit 16 entirely.

A method for producing the position adjustable headrest of the first embodiment will now be described.

First, a bag-shaped outer skin member 12 which is turned upside down is put into a cavity of a lower mold (not shown). Then, the base center portion 12e of the outer skin member 12 is turned up for providing an rectangular opening (not shown) defined by the outer skin member 12. Then, an assembled unit comprising the headrest frame 18, the headrest stays 22, the position adjusting mechanism and the core cases 20 is inserted into the inside space enclosed by the outer skin member 12 with the headrest stays 22 projected outwardly through the rectangular opening. The assembled unit is kept at a given position relative to the outer skin member 12. Then, the patches 24 each having circular through holes 25 with a size slightly smaller than that of the headrest stay 22 are engaged with the stays 22 so as to be positioned just under the outer skin member 12, as illustrated in FIG. 1. Because of the size of the circular hole 25 of the patch 24 relative to that of the stay 22, the patch 24 is kept at a position which is just under the outer skin member 12 through friction between the stay 22 and the patch 24. Then, the rectangular opening is closed by the base center portion 12e of the outer skin member 12. With this arrangement, the short slits 16 are entirely covered with the patches 24. The first inwardly-bent end portion 12h of the base center portion 12e is brought into abutment with the first inwardly-bent end portion 12g of the major center portion 12d. Because of force of the restitution of the outer skin member, the first inwardly-bent end portions 12g and 12h press against each other. Therefore, the long slit 14 is entirely closed.

Then, a pipe (not shown) or the like connected to a reservoir (not shown) of a liquid material for foamed plastic, such as polyurethane foam or the like, is inserted into the inside space of the outer skin member 12 through the long slit 14. Then, the material is poured from the pipe into the inside space.

After finishing pouring the material, the pipe is taken out of the inside space through the long slit 14. The long slit 14 then closes by itself because of its force of restitution.

Then, an upper mold (not shown) is put on the lower mold. The upper mold is placed on a base surface of the outer skin member 12. Thus, thereafter, the material is forced to foam and cure in the inside space of the outer skin member 12. Upon curing, foamed plastic presses the first inwardly-bent end portions 12g and 12h against each other. With this, the long slit 14 is tightly closed, thereby preventing leakage of the foamed plastic through the long slit 14. Because of the provision of the patches 24, leakage of the foamed plastic through the short slits 16 is also suppressed. Because of the position adjusting mechanism being sealingly encased in the core case 20, the liquid material does not affect the function of the mechanism.

After the material is hardened to a sufficient level, the upper mold is removed from the lower mold. Then, a product, viz., a skin-covered foamed article having the stays 22 projecting therefrom is removed from the lower mold. Once the headrest proper is pivoted from a foremost position to a rearmost position, the patches 24, which are made of thin nonwoven cloth, are easily broken so as to produce slits (not shown) therethrough for assuring the smooth movement of the stays 22. These slits of the patches 24 are in alignment with the short slits 16. The patches 24 are kept placed on the back surface of the outer skin member 12 upon practical use of the headrest.

With these steps, the position adjustable headrest as shown in FIG. 1 is produced.

Figure 4:
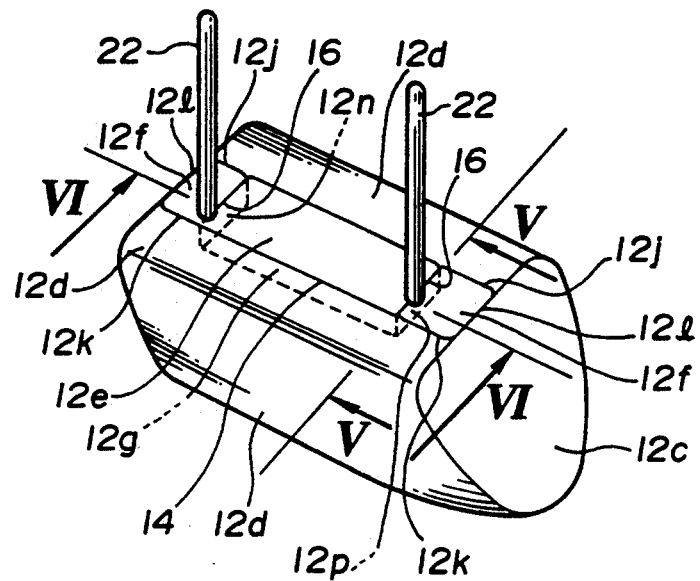
FIG. 4 is a view similar to FIG. 1, but showing a second embodiment of the present invention.
Figure 5:
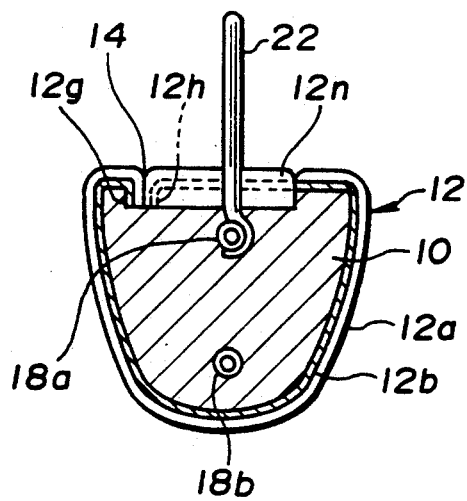
FIG. 5 is a sectional view which is taken along the line V—V of FIG. 4.
Figure 6:
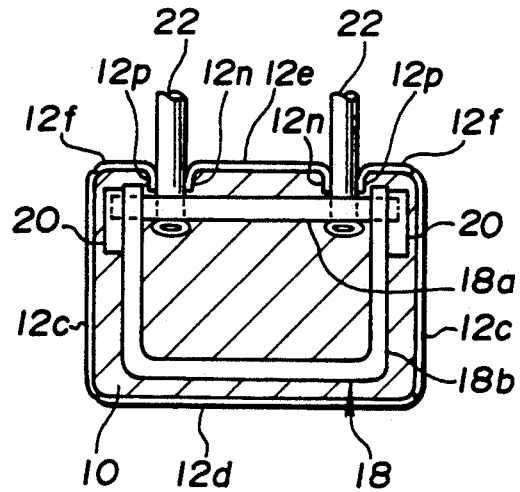
FIG. 6 is a sectional view which is taken along the line VI—VI of FIG. 4.

Referring to FIGS. 4 to 6, there is shown a position adjustable headrest, which is a second embodiment of the present invention.

Parts substantially the same as those of the above-mentioned first embodiment are denoted by the same numerals and a detailed explanation of them will be omitted from the following description.

The base center portion 12e of the outer skin member 12 comprises first inwardly-bent side portions 12n which are rectangular in shape. The base side portions 12f of the outer skin member 12 each comprises second inwardly-bent side portions 12p which are opposed to and in abutment with the first inwardly-bent side portions 12n. Because of flexibility of the outer skin member 12, the first and second inwardly-bent side portions 12n and 12p are bent so as to conform to the shape of the headrest stays 22, and press against each other so as to close the short slits 16.

Regarding a method for producing the headrest of the second embodiment which is substantially the same as that of the first embodiment, upon closing the base center portion 12e of the outer skin member 12, the first inwardly-bent side portions 12n of the base center portion 12e are brought into abutment with the second inwardly-bent side portions 12p of the base side portions 12f for preventing the foamed plastic from leaking out through the short slits.

Thus, leakage of the foamed plastic from the slits 14 and 16 of the outer skin member 12 can be effectively easily suppressed or at least minimized.

What is claimed is:

1. A position adjustable headrest comprising:
a bag-shaped outer skin member having an inside space defined therein, said outer skin member having first inwardly-bent end portions which are opposed to and in abutment with each other, said first inwardly-bent end portions defining a first slit therebetween, said outer skin member having a second slit formed therethrough which is united with said first slit, said outer skin member having a first portion partially bounded by said first and second slits;
a pad member covered by said outer skin member, said pad member being made of plastic, said plastic being foamed and cured in said inside space so as to fill said inside space with said plastic and to press said first inwardly-bent end portions against each other, thereby closing said first slit tightly to prevent said plastic from leaking out through said first slit;
a headrest frame embedded in said pad member;
a stay pivotally connected to said headrest frame, said stay projecting outwardly through said second slit, said stay being movable in said second slit; and
means for closing said second slit for preventing said plastic from leaking out through said second slit wherein said closing means comprises a patch which is lined on a back surface of said outer skin member, said patch being positioned and sized so as to close said second slit when said plastic is foamed and cured in said inside space.

2. A position adjustable headrest comprising:
a bag-shaped outer skin member defining an inside space thereof, said outer skin member having first inwardly-bent end portions which are opposed to and in abutment with each other, said first inwardly-bent end portions defining a first slit therebetween, said outer skin member having second and third slits formed therethrough which are opposed to each other and extend from longitudinally opposed ends of said first slit, said outer skin member having a second portion partially bounded by said first, second and third slits;
a pad member covered by said outer skin member, said pad member being made of plastic, said plastic being foamed and cured in said inside space so as to fill said inside space with said plastic and to press said first inwardly-bent end portions against each other, thereby closing said first slit tightly to prevent said plastic from leaking out through said first slit;
a headrest frame embedded in said pad member;
two stays pivotally connected to said headrest frame, said stays projecting outwardly through said second and third slits, respectively; and
means for closing said second and third slits for preventing said plastic from leaking out through said second and third slits wherein said means for closing comprises two patches which are lined on a back surface of said outer skin member, said patches being positioned and sized so as to close said second and third slits when said plastic is foamed and cured in said inside space.

3. A position adjustable headrest as claimed in claim 2, in which said second and third slits are so sized as to assure smooth movement of said stays, respectively.

4. A position adjustable headrest as claimed in claim 2, in which said outer skin member is made of vinyl chloride which is flexible, such that said first inwardly-bent end portions press against each other by a force of restitution of said outer skin member so as to close said first slit.

5. A position adjustable headrest as claimed in claim 2, in which said patches are made of nonwoven cloth which is so made as to be broken by movement of said stays therethrough, for assuring smooth movement of said stays.

6. A position adjustable headrest as claimed in claim 5, in which each of said patches is made of felt.

7. A position adjustable headrest as claimed in claim 5, in which each of said patches has a hole formed therethrough which is so sized as to be engaged with each of said stays at a desired position of each of said stays.

* * * * *